(12) United States Patent
Scharold et al.

(10) Patent No.: US 7,162,385 B2
(45) Date of Patent: Jan. 9, 2007

(54) CONTROL SYSTEM SIMULATION, TESTING, AND OPERATOR TRAINING

(75) Inventors: Paul G. Scharold, Kennewick, WA (US); D. Dwight Brayton, Richland, WA (US); Christopher S. Ghormley, Portland, OR (US); Shane R. Addleman, Kennewick, WA (US)

(73) Assignee: Fluor Corporation, Aliso Viejo, CA (US)

( * ) Notice: Subject to any disclaimer, the term of this patent is extended or adjusted under 35 U.S.C. 154(b) by 0 days.

(21) Appl. No.: 10/952,085

(22) Filed: Sep. 27, 2004

(65) Prior Publication Data

US 2005/0223120 A1  Oct. 6, 2005

Related U.S. Application Data

(62) Division of application No. 10/129,464, filed as application No. PCT/US00/07962 on Mar. 23, 2000, now Pat. No. 6,823,280.

(60) Provisional application No. 60/177,991, filed on Jan. 24, 2000, provisional application No. 60/177,899, filed on Jan. 24, 2000.

(51) Int. Cl.
*G06F 19/00* (2006.01)

(52) U.S. Cl. .................................... 702/108; 712/226
(58) Field of Classification Search ................ 702/108, 702/120, 121; 712/226
See application file for complete search history.

(56) References Cited

U.S. PATENT DOCUMENTS

| | | | |
|---|---|---|---|
| 5,319,579 A * | 6/1994 | Lipner ........................... 703/6 |
| 5,752,008 A * | 5/1998 | Bowling ....................... 703/13 |
| 2004/0078182 A1* | 4/2004 | Nixon et al. .................. 703/22 |

* cited by examiner

*Primary Examiner*—Edward Raymond
(74) *Attorney, Agent, or Firm*—Rutan & Tucker, LLP

(57) ABSTRACT

A requirements database and test generator generates tests for functional and field testing and generates requirements documentation, user manuals, operational procedures, instrument data sheets, instrument indices, instrument loop diagrams, validation reports, and test reports, including exception and passing reports. A portable process control simulator system which provides control system users with scenarios that mirror field operation as defined.

6 Claims, 1 Drawing Sheet

CONTROL SYSTEM SIMULATION, TESTING, AND OPERATOR TRAINING

This application is a divisional of previously allowed U.S. application with the Ser. No. 10/129,464, which was filed Mar. 4, 2003 now U.S. Pat. No. 6,823,280, which is a 371 of International patent application with the serial number PCT/US00/07962, which was filed Mar. 23, 2000, and U.S. provisional patent applications with the Ser. Nos. 60/177,899 and 60/177,991, which were filed Jan. 24, 2000.

FIELD OF THE INVENTION

The field of the invention is control system simulation, test, and training systems.

BACKGROUND OF THE INVENTION

Control systems incorporating PLCs (Programmable Logic Controlers) and DCSs (Distributed Control Systems) are frequently used to control real world processes by accepting inputs which typically originate from sensors such as, among others, those used to sense temperature, flow, level, radiation, light, movement, and pressure, and those used in generating outputs which are used to drive actuators such as hydraulic devices, valves, lights, and motors. Control systems can often be viewed as having a control component and an interface component, with one or both components having both hardware and software sub-components. Thus a PLC based device might utilize a digital PLC having embedded software as the control component (the "controller"), with an interface component (the "I/O interface") (a) accepting signals from sensors and converting them into a form acceptable to the PLC, and (b) accepting outputs from the PLC and converting them to signals suitable as inputs to the actuators. In such systems, the controller and I/O interface are often connected by one or more paths (the "controller-I/O communication channel) to allow communication and control signals to pass between the controller and the I/O interface. Similarly, the I/O interface is, after the control system is installed in its operating environment, connected via one or more electrical paths (the "field wiring") to the components from which the control system receives its inputs, and to the components to which the control system directs its outputs, with the I/O interface being provided with a plurality of connectors ("field I/O connectors") which facilitate connecting the I/O interface with the field wiring. Many control systems will also incorporate a human-machine-interface (HMI) component comprising hardware and or software for facilitating operator interaction with the control system. FIG. 1 illustrates such a prior art control system 900 having a HMI 910, a controller 920, an I/O interface 930, HMI-controller communication channel 940, a controller-I/O communication channel 950, field wiring 960, and sensor/actuator components 970. In some instances, HMI 910 will be a general purpose computer running a windows based operating system and an application designed to facilitate operator interaction with the control system 900, and both the HMI-controller communication channel 940 and the controller-I/O communication channel 950 will be implemented via the use of a local area network coupling the HMI 910, controller 920, and I/O interface 930 together. Such a setup is shown in prior art FIG. 2 with HMI 910, controller 920, and I/O interface 930 each being coupled to a network hub 980.

It is often typical in development projects that a developer tasked by a customer to build a plant (including any control systems utilized therein) is given a set of requirements which the plant must satisfy before the developer is finished. This is particularly true for the plant control system, which plays a critical part in plant operation. At various stages of development, acceptance testing is performed to determine if the plant control system, to the extent that it is complete, continues to meet the requirements placed on the developer. During acceptance testing it is generally desirable to tie actions taken during the test and the outcomes of such actions to specific requirements so as to show whether the established requirements have been satisfied or not.

Generating test plans, implementing those plans, and correlating test results with requirements to verify requirement satisfaction can be tedious, time consuming, and prone to errors. Although methods and devices for testing control systems are known, they generally have individual strengths and weaknesses which make them more appropriate in some situations and less appropriate in others. A primary weakness of most methods and devices for testing control systems is the inability to properly verify requirement satisfaction. This inability may be at least partially due to the fact that, once installed in a plant, the controller cannot be subjected to as complete or rigorous testing as it can in a lab environment. Another possible factor is the difficulty in correlating large amounts of test results to requirements. Thus, there is continuing need to improve the test generation and requirement verification process.

In addition to the difficulties associated with testing and verification, training operators to use the HMI portion 910 of a control system can sometimes be difficult to achieve in a cost effective manner. Training operators on a "live" system (i.e. one already installed in an operating plant) is not a preferred method as it risks damage to the plant, wastage of material and generally requires that the plant be shut down or operated at less than full capacity during training.

Training on live systems can be avoided through the use of simulators. Such simulators exist, but typically have been performed on large scale mock-ups (i.e. a physical model/re-creation of at least portions of the plant) which typically require large investments in mock-up environments and dedicated spaces in which they can be assembled. It is also often difficult and expensive to keep the mock-up in sync with plant changes. Moreover, training costs tend to increase substantially if operators must travel to an offsite location to be trained. Such travel is often necessary as it is often more cost effective (as much as the use of a large scale mock-up can be cost effective) to utilize a single large scale mock-up and training staff for training operators of similar plants than to have a large scale mock-up and training staff at every plant.

Thus there is a continuing need for improved training systems which allow operators to be trained to operate a plant control system without the use of large scale mockups and/or the necessity to travel away from the plant.

SUMMARY OF THE INVENTION

Methods and apparatus are provided which allow control systems to be tested, and facilitate training operators to operate such control systems.

For the purposes of testing, a test system is coupled to a control system in a manner which allows the test system to communicate with and drive the control system by sending and receiving signals via both the controller-I/O communication channel and the field I/O connectors. In essence, the test system is used to both simulate a plant to be controlled and to monitor, validate, and or modify the internal state of the control system controller and possibly the control system I/O interface. Plant simulation is accomplished by simulating the I/O devices to which the control system is coupled (and hence the plant processes) when installed in its operational environment. In addition to the simulation of I/O devices, the test system takes advantage of the fact that many commonly used controller and I/O interfaces are capable of communication with other devices by using such communications ability to provide instructions to or obtain information from a control system's controller(s) and I/O interface(s).

As an aid in validation, the systems and methods disclosed herein utilize a requirements database and test generator ("RDTG") which consists of a set of software data tables and user screens to facilitate the entry of functional requirements for Programmable Logic Controller (PLC)/Human Machine Interface (HMI) or Distributed Control System (DCS) systems. The RDTG can also generate tests for functional and field testing.

For training operators, the visual portions of a control system HMI are duplicated and coupled to a software and/or hardware simulator to allow simulated plant operations to be performed. In preferred embodiments, the duplicated visual portions of the HMI will be supplemented by audiovisual training aids such as audio and video clips. Various embodiments may also include the ability to compare operator performance to desired goals and/or other requirements.

It is contemplated that the methods and apparatus disclosed herein will provide an effective approach to connecting a control system to be tested to simulated I/O devices and to controlling and monitoring the simulated I/O devices so as to produce inputs to the control system, to record outputs from the control system, and to compare the recorded outputs against an expected value and record the result of the comparison for reporting purposes.

It is also contemplated that the methods and apparatus disclosed herein will provide an effective approach to the staging and testing of PLC/HMIs (Programmable Logic Controllers/Human Machine Interfaces) and DCSs (Distributed Control Systems) before delivery to the field.

It is also contemplated that the methods and apparatus disclosed herein will provide an effective mechanism for validating the operation of a control system once it has been installed in a plant to be controlled. It is contemplated that such a validation include the use of automatically generated reports showing the relationship between requirements, the tests used to validate satisfaction of those requirements, and the results of the validation tests.

It is also contemplated that the methods and apparatus disclosed herein will facilitate onsite/plant training of operators without requiring the creation of large scale mock-ups.

Various objects, features, aspects and advantages of the present invention will become more apparent from the following detailed description of preferred embodiments of the invention, along with the accompanying drawings in which like numerals represent like components.

DETAILED DESCRIPTION

Test System—Overview

Figure 1:
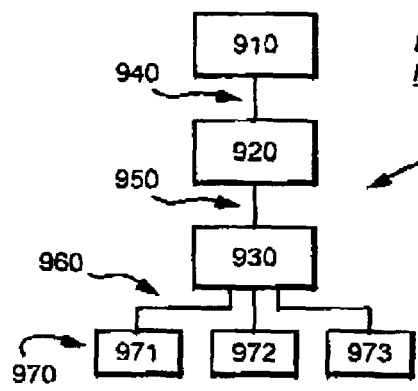
FIG. 1 is a schematic view of a prior art control system.
Figure 2:
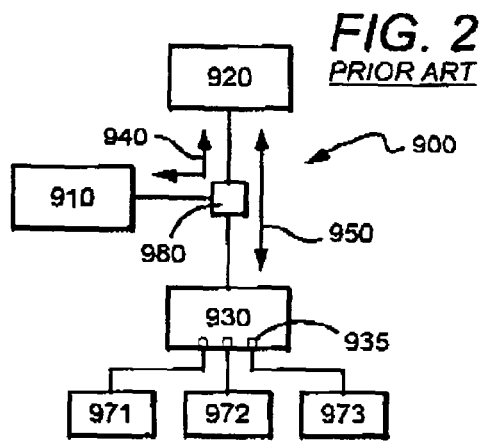
FIG. 2 is a schematic view of a second prior art control system.
Figure 3:
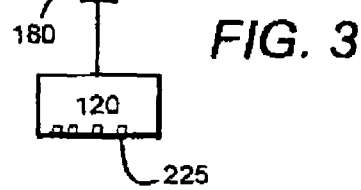
FIG. 3 is a schematic view of a test system.
Figure 4:
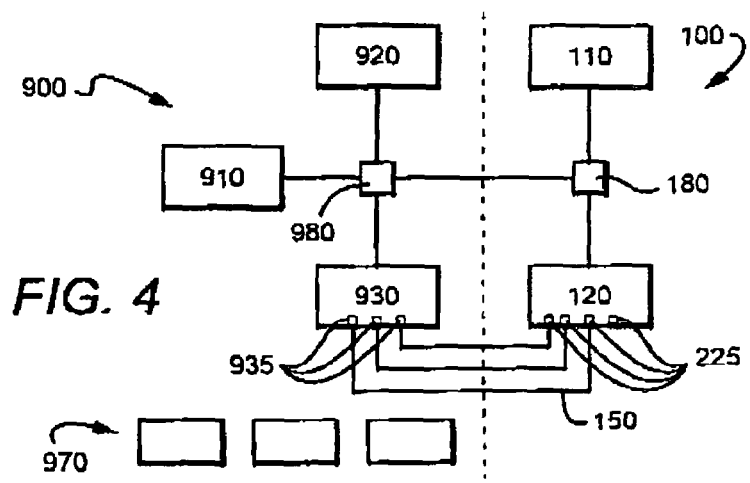
FIG. 4 is a schematic view of the test system of FIG. 3 coupled to the prior art control system of FIG. 2.

Referring to FIG. 3, a test system 100 includes configurator 110, I/O simulator 120, and possibly a network hub 180. Referring to FIG. 4, test system 100 may be coupled to a control system ("CS") 900 by coupling I/O simulator 120 to I/O interface 930 via wiring harness 150 and/or by coupling the I/O simulator 120 and configurator 110 to the controller-I/O network of CS 900.

Test system 100 uses wiring harnesses 150 to send and receive I/O signals to and from I/O interface 930 so as to simulate the input devices/sensors 971 and 973, and output devices/actuators 974 and 976 which would be connected via the field wiring 960 to target CS 900 when target CS 900 is installed. Test system 100 uses the network connection to the CS to obtain register and status information from I/O Interface 930, HMI 910 and PLC 920. By monitoring the internal state of and data flow between I/O Interface 930, HMI 910 and PLC 920, test system 100 is better able to isolate any problems that may occur in target CS 900 during testing as occurring in a particular subsystem of target CS 900. If necessary, any one of the I/O interface 930, HMI 910, and PLC 920 can be tested and/or monitored independently rather than in combination as is likely to be a more typical scenario. The manner in which test system 100 is coupled to target CS 900 also permits test system 100 to test multiple I/O channels and or subsystems of target CS 900 simultaneously.

The test system is preferably automatically initialized by utilizing its connection to the controller-I/O network to query target CS 900 to obtain information which allows test system 100 to perform automatic initialization and mapping of its input and outputs to those of target CS 900. Test system 100 incorporates a knowledge base which includes characteristics of known control system hardware and software components in performing such automatic initialization. It is contemplated that the knowledge base might be extended to include mathematical models of standard components such as sensors and actuators to allow test system 100 to better simulate such components and to allow automatic test generation for target systems which will be coupled to such components.

Test System—Offsite Testing

Test system 100 is contemplated as being beneficial in the development and offsite testing of target CS 900 by simulating the plant which target CS 900 is intended to control. If the capacity of a single test system 100 is insufficient to simulate an entire plant, multiple test systems 100 can be used to achieve the simulation. Such a combination of test systems 100 may utilize multiple HMI 110 devices, or may share a single HMI 110. Test system 100 is also contemplated as being beneficial for offsite training of personnel in the operation of target CS 900 when test system 100 is used in conjunction with target CS 900. Such offsite use of test system 100 is contemplated as providing, among others, complete testing of all target CS 900 inputs and resulting outputs before field installation Test System—Onsite Testing Onsite testing is also contemplated as benefiting from the use of test system 100, either in its entirety or only its configurator/HMI portion. Once target CS 900 is installed in its operational environment, configurator 110 can be used as a test and validation tool. The configurator 110 can provide step-by step instructions to a field tester which, if followed, result in a desired level of testing of target CS 900. By doing so, configurator 110 essentially controls the test process through the field tester. By requiring feedback from the field tester upon the completion of various portions of the testing, a test report which includes the tests steps performed and the tester responses can be generated so as to provide assurance that the required level of testing has be completed. Such "controlled" testing thus provides a method of repeatable, validated and verified testing. Configurator 110 can also be used to record the results of such testing and to generate reports in the field which provide feedback as to the current state of target CS 900 and the field wiring to which target CS 900 is coupled.

If the entire test system 100 is used onsite, test system 100 can be interchanged with selected inputs and outputs of target CS 900 so as to allow "live" inputs to cause target CS 900 to control simulated actuator components, or to use simulated inputs to cause target CS 900 to control "live" actuator components, or to mix and match live and simulated inputs and outputs as desired. If configurator 110 is still attached to the rest of test system 100 during testing, and if test system 100 is coupled to target CS 900 during testing, configurator 110 can control the test process both through direct interaction with target CS 900 and through a test operator as previously discussed.

Configurator

HMI/configurator 110 of test system 100 is contemplated as being a general purpose computer such as a laptop PC ("PC"). Portability is particularly desirable as it facilitates the transportation of HMI 110 into the field to support onsite testing of an installed target CS 900. HMI 110 is contemplated as incorporating software which allows testing of alarm responses (including deadbands), loops, and logic, and reporting of HMI readouts, trend graphs, alarms, reports, system requirements, etc. Test results are stored in the form of textual date and time stamped data, graphs, and tester responses to prompted questions.

In a preferred embodiment, HMI 110 includes a multi-tasking operating system, preferably Windows NT™, which is capable of supporting a graphical user interface ("GUI") and a relational database system (preferably Microsoft Access™), as well as software for controlling I/O simulator modules 120, and testing target CS 900. HMI 110 is also preferred to include an Ethernet network interface card for connection to the controller-I/O network which is often a TCP/IP based Ethernet network. It is also preferred that HMI 110 of test system 100 be detachable from the rest of test system 100 to allow it to be used independently as an onsite verification tool.

As previously discussed, the HMI/configurator portion 110 of test system 100 is useful both in the operation of test system 100, but also as a detachable validation and/or training tool. It is contemplated that HMI/configurator 110 comprise the software and one or more databases necessary to allow it to perform its training and/or validation functions. Such functions might include, among others, the ability to control access by requiring an operator to log in, the ability to simulate a particular function and to test the capability of the target CS to respond to a sensor's entire range of input, the ability to prompt the operator to perform operations using the target CS HMI, and automatically performing tests against target CS when such tests do not require manual operations by an operator.

Configurator—Interactive Testing

A particular configurator embodiment is likely to have the ability to store and run multiple tests wherein each test comprises one or more steps. In running a particular test or sequence of test steps, the configurator will prompt the operator to perform a function on the target CS whenever manual intervention by the operator is required, but will automatically (i.e. without operator action) run through any tests steps which do not require such manual intervention. Thus, to test a pump, the configurator may prompt an operator to turn on the pump, then, after the operator has indicated to the configurator that he has turned on the pump, the configurator will ask a question to verify proper operation of the pump such as "Did the pump indicator light turn on?" which the operator can either respond to affirmatively or negatively. If negatively, the configurator will prompt the operator to enter a comment as to what response by the target CS was actually seen. During another step, the configurator may generate simulated events to which the target CS has automated responses which can be detected by the configurator and in which case the simulator will simply simulate the events and monitor the target CS's response. As an example, if a power voltage level exceeds a threshold amount the target CS may be required to cut off the source of power. Such a test would be performed by the simulator at the appropriate point in a test sequence by sending an over voltage signal to the target CS and monitoring the response of target CS to see if a power cutoff signal is sent. Test results, whether operator responses or automatically monitored events/values are also stored in one or more databases so that an exceptions report comparing actual target CS responses to expected results can be generated.

Configurator—Test Databases

It is contemplated that the configurator will comprise a scalable library of test databases and test functions utilizing the test databases to perform the test steps. Utilizing database tables to store tests and test parameters allows a tester to add new tests and/or test scenarios, and also to modify parameters for existing tests. Such scalable libraries and dynamic updates make for a much more robust and flexible system.

HMI/configurator 110 provides for downloading test relational databases, initiating tests and capturing tester responses and comments, and generating reports. The test databases include test cases, expected results for test comparison and exception generation. An overall test planner database organizes the sequence of test events. Being as the test databases are derived from the requirements database, the system owner is assured of lock-step configuration control and traceable requirements testing.

Configurator—Requirements Database and Test Generator

A requirements database and test generator ("RDTG") consists of a set of software data tables and user screens to facilitate the entry and maintenance of complete functional requirements in database format for Programmable Logic Controller (PLC)/Human Machine Interface (HMI), or Distributed Control System (DCS) systems. The RDTG also generates tests for functional and field testing for use by the simulator system described in U.S. provisional application No. 60/126060 ("test system") incorporated herein by reference in its entirety.

The RDTG data tables contain information that is used in implementing and testing of a target control system. The information in the data tables is gathered during requirements definition, also referred to as the Description of System Requirements (DSR), and contains information about all aspects of the system, including architecture, tags, networking, loops (e.g., PID, etc.), alarms, instrument indications, trending, general requirements, etc. This information is stored in a tagbase section (numerical data), testbase section (descriptive data for QTP and ATP), and expected results section. Requirements may be stored and/or presented in any multimedia format, including text, graphics, and sound. Implementation of the system by developers is managed via this required system functions set.

After implementation (complete or partial), RDTG will automatically generate a series of requirements-associated pre-defined test and test case data tables for the test system for pre-field/offsite and at-field/onsite testing (e.g., PLC, HMI, wiring, field connections, loops, logic, instruments, control elements, etc.). This ensures that all requirements, and testing of those requirements, and any changes to the system are kept in "lock-step" to ensure a reliable product, by means of electronic test, documentation and results. The RDTG can also be used for a rapid update of requirements and revalidation of any changes via the test system. The test system testing engine utilizes these RDTG predefined test and test case data tables to run tests per the proper sequence, and reports the passing and failing results automatically. This verifies the configuration and programming of a target control system.

Therefore, three levels of testing are performed with these RDTG data tables. The first level is a checkout of the system during development, as required. The second level is the functionality test, or Qualification Test Procedure (QTP). In the QTP, the system's functions are thoroughly checked by the test system against the requirements set forth by the client in the DSR (encapsulated in the RDTG data tables). The third level of testing performed by the test system is by the Acceptance Test Procedure (or ATP) which occurs when the QTP-tested system is installed in the field, and tested per a second set of RDTG-configured data tables. Any test exception triggers a retest on the failed test, plus any listed prerequisite test.

The RDTG provides many advantages including, but not necessarily limited to, the following: (1) provides complete functional requirements database(s) for a target PLC/HMI system (probably in the form of Boolean expressions relating tags and data values); (2) generates, from the functional requirements database(s), test databases automatically for the test system for pre-field and at-field testing (e.g., PLC, HMI, wiring, field connections, loops). By having the RDTG generate the test databases there is a higher level of assurance that requirements, testing of those requirements, and any changes to the system are kept in "lock-step" to ensure a reliable product, by means of electronic test, documentation and results; (3) provides automatic document production, including requirements documentation, user manuals, operational procedures, instrument data sheets, instrument indices, instrument loop diagrams, validation reports, and test reports, including exception and passing reports. The system can be used for rapid update of requirements, revalidation of any changes, and instant update of related system documentation, thereby providing automatic configuration control.

Wiring Harness

Wiring harness 150 may take on almost any form so long as it properly transmits I/O signals between test system 100 and target CS 900. However, it is preferred that wiring harnesses 150 be chosen to facilitate the coupling of target CS 900 to test system 100 and the simulation of the field wiring to which target CS 900 will be coupled in its operational environment. It is contemplated that several different harnesses may be included with the test system 100 with each harness being designed to facilitate the coupling of test system 100 to a particular type of target CS 900. The inclusion of such pre-configured harnesses is contemplated as facilitating the use of test system 100 to test a variety of standard control systems such as Allen-Bradley PLC-5 controllers or Siemens S7 controllers.

Example Application

Test system 100 is contemplated as being particularly well suited for a number of uses when taken to an operational facility and connected in place of all or part of the field wiring including but not necessarily limited to: (1) testing existing logic for reaction to new scenarios; (2) testing new logic for operations; (3) training process operators prior to an operational campaign to a) score and validate operator readiness, b) identify deficient training areas, and c) ensure operational readiness as an overall team; (4) training process operators at the operational facility using by plugging test system 100 in place of the plant's actual sensors and actuators; (4) field trouble shooting of wiring and other field related problems.

Example—Offsite Testing

An example application of test system 100 is its in revalidating a PLC program used to manufacture a drug wherein the PLC does so by controlling ingredient weighing, heating, cooling, tank level control, pump control, and other portions of the manufacturing process. This example refers to target CS 900 as if it were the system to be re-validated. Revalidation of the PLC program of target CS 900 would involve first using the test system 100 to perform offsite testing of target CS 900, and then detaching the HMI/Configurator from the rest of test system 100 and taking it onsite in the field with target CS 900 when target CS 900 is installed at the drug production facility.

During offsite/lab testing, I/O simulation modules 120 are used to provide an input to each of the PLC I/O channels via field I/O connectors 225. The test system automatic initialization routines create a mapping between the target PLC and test system I/O channels. A tester would log into the test system configurator computer/HMI 110 (requiring operators to log in facilitates future auditing). After logging in, test databases are downloaded from a requirements database that was established for target CS 900 at the project start. The test databases are then used to test all functions of the PLC, HMI and network including alarms, loops, and field wiring to satisfy the testing requirement contained in the test databases. Such testing is accomplished via a series of automatic tests, as well as tests which prompt the operator to perform certain actions and to provide responses/inputs to the HMI after performing such actions. The testing of alarms includes the testing of deadbands, and appropriate low-low, low, high, and high-high alarm ranges as well as other types of data deltas. All data can be stored electronically with a date and time stamp as well as with other audit information as necessary.

Once offsite/lab testing is complete, the test system configurator/HMI 110 is datached from the test system and target CS 900 and taken to the field to be used onsite to test target CS 900 once it is installed in the drug production facility. In the field, the test system configurator provides a field tester with a series of tests related to field I/O and wiring connections. For some tests, the field tester is prompted by the test system configurator to instruct a technician, possibly via cell-phone, to input signals to the system which will be passed to target CS 900 via the field wiring. The test system configurator 110 then prompts the field tester to enter responses answering questions related to the feedback HMI 230 of target CS 900 provided to the tester in response to the technician's inputs. All test questions and results are stored so as to allow a report of test results to be generated.

Example—Onsite Testing

Once test target CS 900 is installed in the drug production facility, test system 100 can periodically be used to train process operators. Such training can be done on site, using the target CS 900 HMI by simply disconnecting target CS 900 from the plant's sensors and actuators, probably by disconnecting the field wiring, and connecting test system 100 to target CS 900 in place of the sensors and actuators. Once target CS 900 is operating with simulated I/O rather than live sensors and actuators, operators are free to interact with target CS 900 without any fear of consequences to the plant. When used in such a manner, the test procedures used to validate target CS 900 may be used in training operators, or else test system 20 may incorporate specific software and/or data for training operators. Such software and/or data may incorporate multi-media presentations such as training videos. Test system 20 may also work partially or completely independently of the operator so as to simulate events, track operator responses to the simulated events, and/or report on the quality of the operator's responses, without the operator having to interact with Test system 20 during training.

Software Based Training

It is contemplated that operator training can be improved through use of the test system previously described or through an independent, software only solution stored on a computer readable removable media such as a DVD or CD-Rom.

A method for training an operator to operate a plant control system may comprise: a) simulating the HMI portion of the plant control system; b) simulating the control portion of the plant control system; d) simulating the plant itself; e) coupling the simulated HMI, control system, and plant components together such that operator interaction with the simulated HMI results in the HMI being updated as if the operator was interacting with the HMI portion of a live control system; and f) causing the operator to interact with the simulated HMI.

For control systems utilizing hardware I/O such as control panels comprising knobs, switches, and dials, simulating the HMI involves creating graphic representations of the control panels and the controls contained thereon. For software based systems, it involves reproducing the HMI, either by duplicating the HMI software, or by taking pictures of the interface (via screen capture techniques) and coupling the pictures to software which can accept and monitor user inputs and updating the visual images seen by the operator. Duplicating the HMI software and coupling it to a controller simulator and/or plant simulator tends to result in a very realistic simulation. However, doing so frequently requires that the HMI software be modified. Modification of the HMI software is not always desirable in that it may introduce errors into the simulation. Moreover, it typically requires a license and access to the source code of the HMI to duplicate and/or modify it. Both the source code and a license to copy and modify can be hard to come by if a developer of training materials is not associated with the HMI software developer. In such cases, screen shots of the visual aspects of the HMI can be used to simulate the HMI.

The controller simulator is preferably modeled via software. The plant simulator may be hardware and/or software based. Hardware based plant simulation can be accomplished via the previously described test system. Software based plant simulation can utilize simple models such as simply using process test data, or complex utilizing sophisticated math models, or a hybrid of the two. Typically a combination of the two are needed to create an effective simulation of the process.

The simulator system can be better adapted to training by adding scoring modules and the desired starting conditions. Heuristics can also be added to adjust the training content and scenario at run-time.

Simulation allows training and testing sequences, i.e. emergency situations, which would otherwise not be possible. Both simulation and training systems can be placed upon CD-ROM, DVD, etc. and run, independent of the control system.

An example embodiment is a simulator system for simulating a monitoring system for sluicing operations. The actual operator HMI of the sluicing monitoring system is used as the "front-end" and a simulation engine resides in code with scenarios programmed for the operators' training exercise. All HMI screens, code and data files reside on CD-ROM. When placed in any personal computer type-machine with a CD-ROM, the installer automatically runs the application and the user is presented with one of several scenarios to choose from. The simulation then starts giving different operational scenarios that are scored based on criteria. When the person makes a decision to monitor one device, heuristics interject and make adjustments to that scenario, testing the person's skill. Video files are available, as are sound, and procedures for detailed training are also available.

It is contemplated that in some instances it may be beneficial to combine testing and training so that an operator learns how to use a control system at the same time the system is tested.

CONCLUSION

Thus, specific embodiments and applications of devices and methods for plant simulation, plant control system testing, and plant operator training have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method for training an operator to operate a plant control system comprising:

simulating an HMI portion of the plant control system;
   simulating the control portion of the plant control system;
   simulating the plant sensors and actuators;
   coupling and using the simulated HMI, simulated control system, and simulated sensor and actuators together such that operator interaction with the simulated HMI results in the HMI being updated as if the operator was interacting with the HMI portion of a live control system;
   wherein the steps of simulating and using are performed on a computer that is uncoupled from the plant control system; and
   causing the operator to interact with the simulated HMI.

2. The method of claim 1 wherein the HMI portion of the plant control system comprises a computer display screen, and simulating the HMI portion of the plant control system includes obtaining images of the display screen during operation of the HMI, and utilizing the obtained images in simulating the HMI portion of the plant control system.

3. The method of claim 2 wherein the simulated HMI, simulated control system, and simulated plant are each software based and stored on a removable storage medium.

4. The method of claim 3 wherein the storage medium is a CDROM or DVD disk.

5. The method of claim 4 wherein the step of simulating the plant is accomplished via a hardware simulator.

6. A method of testing a control system and training an operator comprising:

provticing an operator to be trained;

coupling a test and training system to a plant control system; wherein the plant control system controls a plurality of actuators in a plant;

causing the test and training system to output a report that indicates both the quality of the operator's performance and the quality of the control system's performance during the period when the operator was interacting with the control system.

* * * * *